July 23, 1957 O. L. PATTERSON 2,800,585
ELECTRONIC SWITCH
Filed Jan. 13, 1954
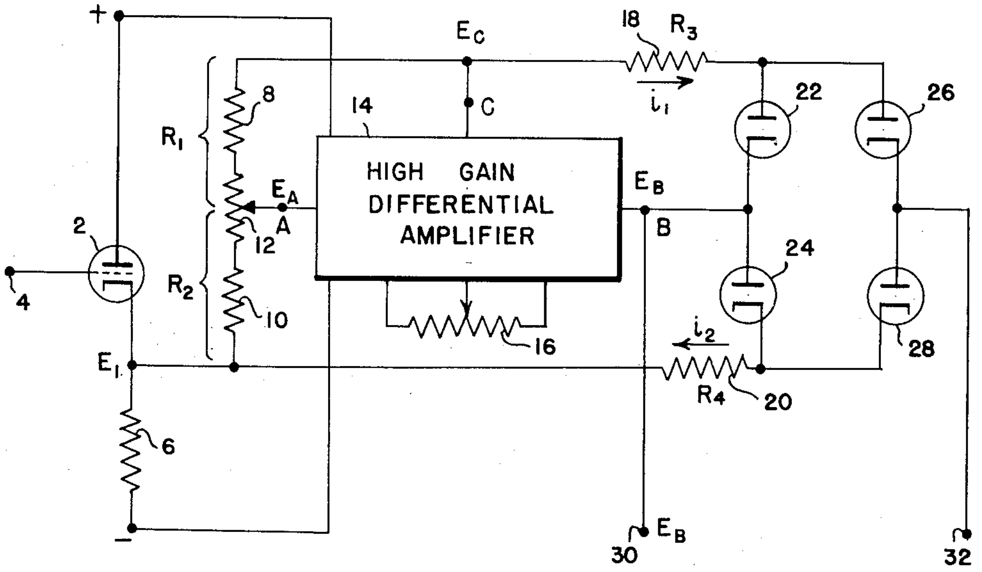
(1) $E_C = \mu (E_B - E_A)$
(2) $\frac{R_1}{R_2} = \frac{R_3}{R_4}$
(3) $E_A = \frac{R_2 E_C + R_1 E_1}{R_1 + R_2} = E_B$
(4) $\frac{E_C - E_B}{R_1} = \frac{E_B - E_1}{R_2}$
(5) $\frac{E_C - E_B}{R_3} = \frac{E_B - E_1}{R_4}$
(6) $i_1 = i_2$
*INVENTOR.*
OMAR L. PATTERSON
*BY*
Busser, Smith & Harding
ATTORNEYS United States Patent Office 2,800,585
Patented July 23, 1957

2,800,585
ELECTRONIC SWITCH

Omar L. Patterson, Media, Pa., assignor to Sun Oil Company, Philadelphia, Pa., a corporation of New Jersey Application January 13, 1954, Serial No. 403,800
8 Claims. (Cl. 250—27)

This invention relates to an electronic switch comprising four diodes and having characteristics more satisfactory than the four diode switches heretofore known.

Four diode switch circuits of types heretofore known suffer from the disadvantage of loading the external circuits which are being switched and, therefore, they are suitable for switching only low impedance circuits. Zero loading will occur at only one potential of the external circuit. In addition, if the external circuit is of high impedance and varies over a wide voltage range, a considerable amount of the switching waveform will appear in the external circuit through the diode interelectrode capacitances. In order to minimize the loading effect, it is necessary to use a minimum current through the diodes (when conducting) and this results in a varying switch resistance due to the variable diode resistance at low currents. Finally, the four diode switching circuits require a very stable push-pull switching waveform.

In accordance with the present invention, there is provided a four diode switch circuit which overcomes the disadvantages above mentioned. A single-ended switching signal only is required and, if the switching waveform is a square wave, it need not be perfectly flat and of stable amplitude as is necessary with the usual four diode switch arrangement. Insurance is provided so that no current enters the external circuit from the switching circuit, and it is permissible to employ a sufficiently high current during conduction of the diodes to obtain a constant and very low value of switch resistance. With a suitable choice of resistance values in the circuit, the switching waveform is balanced out of the external circuit so far as diode interelectrode capacitances are involved, regardless of the level of the switched potential.

The attainment of these objects and the provision of other objects particularly relating to details of construction and operation will become apparent from the following description read in conjunction with accompanying drawing which shows a wiring diagram of the improved circuit together with equations pertinent thereto and explanatory of its operation.

There is supplied through a switching signal input terminal 4 a suitable switching waveform which, desirably, approaches the form of a rectangular wave but, as will appear hereafter, need not be subject to special control to insure perfect flatness or stability of its amplitude. It is sufficient if it is of sufficient amplitude to insure switching over the range of potential at which the circuit to be switched operates. The terminal 4 is connected to the grid of a triode 2 forming a cathode follower in conjunction with a resistance 6 which is returned to the negative terminal of a power supply, the positive terminal of which is connected to the anode.

A pair of resistances 8 and 10 are arranged in series with an intermediate potentiometer resistance indicated at 12, the lower terminal of the resistance 10 being connected to the cathode of triode 2. The potentiometer is provided with an adjustable contact to insure between the contact and the upper end of resistance 8 and between the contact and the lower end of resistance 10 total resistance values indicated by $R_1$ and $R_2$ which, as will appear, must, for proper operation, be properly related to other resistances in the circuit. As will also appear hereafter, it is generally desirable that $R_1$ should equal $R_2$.

A high gain differential amplifier is provided at 14, and has the input terminals A and B and the output terminal C. The potentials at these terminals are respectively indicated at $E_A$, $E_B$ and $E_C$. The high gain differential amplifier may take various forms but may, desirably, be of the type described on page 485, Vacuum Tube Amplifiers, Radiation Laboratory Series, volume 18. The property of an amplifier of this type is expressed by Equation 1, showing that the output potential is proportional, by a factor mu to the difference in potentials of the input terminals. The particular factor of proportionality is relatively unimportant, but is very high. Through the control effected at the output terminal C, the differential amplifier has the property of insuring almost precise equality of the potentials $E_B$ and $E_A$. A zero adjustment of the high gain differential amplifier is provided at 16 and is usual as described in said reference. The differential amplifier receives its D. C. supply from the same positive and negative power supply terminals supplying the cathode follower 2, 6. The inputs of this differential amplifier have high impedance so that the differential amplifier imposes no appreciable loading on the circuit associated therewith.

The terminal A of the amplifier 14 is connected to the adjustable contact of potentiometer 12, while terminal C is connected to the free end of resistance 8. Four diodes form the actual switch of the circuit, these diodes, designated 22, 24, 26 and 28, being arranged among themselves in conventional fashion with the anodes of the diodes 22 and 26 connected together and the cathodes of diodes 24 and 28 connected together. The cathode of diode 22 is connected to the anode of diode 24 and the cathode of diode 26 is connected to the anode of diode 28. The cathode of diode 22 and anode of diode 24 are connected to the terminal B of the amplifier and to a terminal 30 which is connected to the external circuit to be switched. The cathode of diode 26 and anode of diode 28 are connected to the second terminal 32 of the external circuit to be switched, the object of the switching arrangement being to provide a connection between the terminals 30 and 32 at the time of a negative input switching signal at terminal 4.

A resistance 18 having a value $R_3$ connects the terminal C of the amplifier to the anodes of the diodes 22 and 26. A resistance 20 having a value $R_4$ connects the lower end of resistance 10 to the cathodes of the diodes 24 and 28. The currents through the resistances 18 and 20 are, respectively, indicated at $i_1$ and $i_2$. The potential at terminal 30 and the terminal B of the differential amplifier is designated $E_B$. The potential at the cathode of triode 2 is designated $E_1$.

That switching occurs to connect terminals 30 and 32 upon the application of a negative switching signal at 4 will be clear if a particular potential is assumed at $E_B$. If $E_1$ is more negative than $E_B$, then for $E_A$ to equal $E_B$ the differential amplifier must produce at C a potential $E_C$ more positive than $E_B$ and, therefore, more positive than $E_1$. The diodes are, therefore, conducting. On the other hand, if $E_1$ is more positive than $E_B$, a reverse situation must exist and the diodes are cut off. The switching potential at $E_1$ must, for insurance of switching, range positively and negatively beyond the maximum excursions of $E_B$.

The operation of the circuit in securing the advantages set forth above may be best explained through the medium of the equations in the drawing. It may be first assumed that adjustment is provided at potentiometer 12 to insure the relationship indicated in Equation 2. (At this time, it may be assumed that $R_1$ is different from $R_2$ so that the ratios in this equation differ from unity.)

The operation of the differential amplifier 14 insures substantial equality between $E_A$ and $E_B$ by virtue of the control of the potential $E_C$ which will change the current flow through the resistances 8 and 10 and the resistance of potentiometer 12. Study of the circuit will show, therefore, that there follows the condition expressed in Equation 3.

From this there may be readily derived the Equation 4, and combining Equations 2 and 4 there is obtained Equation 5. Assuming that the diodes 22, 24, 26 and 28 are highly conductive and of negligible resistance with respect to resistances $R_3$ and $R_4$, or at least are matched so that the resistances of the respective diodes of the upper and lower pairs are equal, there follows the Equation 6 of equality between the currents $i_1$ and $i_2$.

If these last named currents are equal, it is evident that the contribution to the external circuit to be switched from the switching signal must be zero. This condition is actually maintained by virtue of the action of the high gain differential amplifier which imposes the conditions described. It will be noted that this occurs irrespective of the level of the potential $E_B$ which is involved in the external circuit. So long, therefore, as the operation is within the range of the differential amplifier, there will be no contribution from the switching signal which means that so long as the switching potential is sufficient to insure conductivity of the diodes its waveform is immaterial. There is thus no necessity for insuring that the switching waveform is a true square wave of controlled amplitude.

The foregoing is true if there is neglected the interelectrode capacitances in the diodes. If these capacitances are approximately the same, then their effect may be eliminated by equality of $R_1$ and $R_2$ and of $R_3$ and $R_4$ so that the ratios expressed in Equation 2 are unity. The adjustment at potentiometer 12 serves to set the resistance ratio accurately and also allows the minor compensation necessary to take care of the finite gain of the differential amplifier. The adjustment at potentiometer 16 is a zero adjustment to adjust for equality of currents in and out of the switching circuit.

Since no current enters the external circuit from the switching circuit, it is permissible to employ a sufficiently high current during conduction of the diodes to obtain a constant and very low value of switch resistance.

It may be noted that, although this circuit requires a differential amplifier in addition to the four diode switch arrangement, this additional circuitry is compensated by the circuitry required for a very stable and accurate push-pull switching waveform required by the usual four diode switching circuit which suffers from the inherent disadvantages described above. Accordingly, the present circuit is fundamentally no more complex than that which is required to secure reasonably satisfactory operation of a conventional four diode switch.

It will be evident that various details of the circuit may be varied without departing from the invention as defined in the following claims. For example, depending upon the accuracy of performance which is required, there may be used other differential amplifiers having less gain if the demands are not so stringent as those which are satisfied only by the use of a very high gain differential amplifier.

What is claimed is:

1. An electronic switch comprising a pair of first terminals, parallel circuits between said first terminals having intermediate points joined respectively to second terminals to be selectively connected and disconnected, said circuits including unidirectionally conductive elements, means providing a switching signal, a differential amplifier having one input connected to one of said second terminals, and having its output connected to one of said first terminals, resistance means connected between said output of the differential amplifier and said means providing a switching signal, said differential amplifier having its other input connected to an intermediate point of said resistance means, and said means providing a switching signal being connected to the other of said first terminals.

2. An electronic switch comprising a pair of first terminals, parallel circuits between said first terminals having intermediate points joined respectively to second terminals to be selectively connected and disconnected, said circuits including unidirectionally conductive elements, means providing a switching signal, a differential amplifier having one input connected to one of said second terminals, and having its output connected to one of said first terminals, the last mentioned connection including a resistance, resistance means connected between said output of the differential amplifier and said means providing a switching signal, said differential amplifier having its other input connected to an intermediate point of said resistance means, and said means providing a switching signal being connected to the other of said first terminals, the last mentioned connection including a resistance.

3. An electronic switch comprising a pair of first terminals, parallel circuits between said first terminals having intermediate points joined respectively to second terminals to be selectively connected and disconnected, said circuits including unidirectionally conductive elements, means providing a switching signal, a differential amplifier having one input connected to one of said second terminals, and having its output connected to one of said first terminals, the last mentioned connection including a resistance, resistance means connected between said output of the differential amplifier and said means providing a switching signal, said differential amplifier having its other input connected to an intermediate point of said resistance means, and said means providing a switching signal being connected to the other of said first terminals, the last mentioned connection including a resistance, the ratio of the resistances between the second mentioned input of the differential amplifier and its output and said means providing a switching signal, respectively, being approximately equal to the ratio of the resistances between said output and the first mentioned of said first terminals and between said means providing a switching signal and the other of said first terminals, respectively.

4. An electronic switch comprising a pair of first terminals, parallel circuits between said first terminals having intermediate points joined respectively to second terminals to be selectively connected and disconnected, said circuits including unidirectionally conductive elements, means providing a switching signal, a differential amplifier having one input connected to one of said second terminals, and having its output connected to one of said first terminals, the last mentioned connection including a resistance, resistance means connected between said output of the differential amplifier and said means providing a switching signal, said differential amplifier having its other input connected to an intermediate point of said resistance means, and said means providing a switching signal being connected to the other of said first terminals, the last mentioned connection including a resistance, the ratio of the resistances between the second mentioned input of the differential amplifier and its output and said means providing a switching signal, respectively, being approximately equal to the ratio of the resistances between said output and the first mentioned of said first terminals and between said means providing a switching signal and the other of said first terminals, respectively, said ratios being approximately unity.

5. An electronic switch comprising a pair of first terminals, parallel circuits between said first terminals, each of said parallel circuits including a pair of diodes in series, all of said diodes being connected to conduct in the same direction between said first terminals, the junctions of the pairs of diodes arranged in series being joined respectively to second terminals to be selectively connected and disconnected, means providing a switching signal, a differential amplifier having one input connected to one of said second terminals, and having its output connected to one of said first terminals, resistance means connected between said output of the differential amplifier and said means providing a switching signal, said differential amplifier having its other input connected to an intermediate point of said resistance means, and said means providing a switching signal being connected to the other of said first terminals.

6. An electronic switch comprising a pair of first terminals, parallel circuits between said first terminals, each of said parallel circuits including a pair of diodes in series, all of said diodes being connected to conduct in the same direction between said first terminals, the junctions of the pairs of diodes arranged in series being joined respectively to second terminals to be selectively connected and disconnected, means providing a switching signal, a differential amplifier having one input connected to one of said second terminals, and having its output connected to one of said first terminals, the last mentioned connection including a resistance, resistance means connected between said output of the differential amplifier and said means providing a switching signal, said differential amplifier having its other input connected to an intermediate point of said resistance means, and said means providing a switching signal being connected to the other of said first terminals, the last mentioned connection including a resistance.

7. An electronic switch comprising a pair of first terminals, parallel circuits between said first terminals, each of said parallel circuits including a pair of diodes in series, all of said diodes being connected to conduct in the same direction between said first terminals, the junctions of the pairs of diodes arranged in series being joined respectively to second terminals to be selectively connected and disconnected, means providing a switching signal, a differential amplifier having one input connected to one of said second terminals, and having its output connected to one of said first terminals, the last mentioned connection including a resistance, resistance means connected between said output of the differential amplifier and said means providing a switching signal, said differential amplifier having its other input connected to an intermediate point of said resistance means, and said means providing a switching signal being connected to the other of said first terminals, the last mentioned connection including a resistance, the ratio of the resistances between the second mentioned input of the differential amplifier and its output and said means providing a switching signal, respectively, being approximately equal to the ratio of the resistances between said output and the first mentioned of said first terminals and between said means providing a switching signal and the other of said first terminals, respectively.

8. An electronic switch comprising a pair of first terminals, parallel circuits between said first terminals, each of said parallel circuits including a pair of diodes in series, all of said diodes being connected to conduct in the same direction between said first terminals, the junctions of the pairs of diodes arranged in series being joined respectively to second terminals to be selectively connected and disconnected, means providing a switching signal, a differential amplifier having one input connected to one of said second terminals, and having its output connected to one of said first terminals, the last mentioned connection including a resistance, resistance means connected between said output of the differential amplifier and said means providing a switching signal, said differential amplifier having its other input connected to an intermediate point of said resistance means, and said means providing a switching signal being connected to the other of said first terminals, the last mentioned connection including a resistance, the ratio of the resistances between the second mentioned input of the differential amplifier and its output and said means providing a switching signal, respectively, being approximately equal to the ratio of the resistances between said output and the first mentioned of said first terminals and between said means providing a switching signal and the other of said first terminals, respectively, said ratios being approximately unity.

References Cited in the file of this patent

UNITED STATES PATENTS

| | | |
|---|---|---|
| 2,443,195 | Pensyl | June 15, 1948 |
| 2,570,225 | Felker | Oct. 9, 1951 |
| 2,577,015 | Johnson | Dce. 4, 1951 |